United States Patent [19]

Jalbert et al.

[11] Patent Number: 4,654,405
[45] Date of Patent: Mar. 31, 1987

[54] CARBOXYLATED PHENYLENE ETHER RESINS

[75] Inventors: Ronald L. Jalbert, Woodland Park; Thomas S. Grant, Vienna, both of W. Va.

[73] Assignee: Borg-Warner Chemicals, Inc., Parkersburg, W. Va.

[21] Appl. No.: 804,947

[22] Filed: Dec. 5, 1985

[51] Int. Cl.$^4$ .................. C08L 71/04; C08L 77/00
[52] U.S. Cl. ........................... 525/391; 525/392; 525/397
[58] Field of Search ................. 525/391, 392, 397

[56] References Cited

U.S. PATENT DOCUMENTS

| | | | |
|---|---|---|---|
| 3,134,753 | 6/1958 | Kwiatek | 528/212 |
| 3,306,874 | 2/1967 | Hay | 528/215 |
| 3,356,761 | 12/1967 | Fox | 522/138 |
| 3,375,228 | 3/1968 | Holoch et al. | 525/397 |
| 3,383,435 | 5/1968 | Cizek | 525/132 |
| 3,522,326 | 7/1970 | Bostick et al. | 525/391 |
| 3,557,045 | 1/1971 | Wright et al. | 525/391 |
| 4,011,200 | 3/1977 | Yonemitsu et al. | 528/86 |
| 4,038,343 | 7/1977 | Yonemitsu et al. | 525/135 |
| 4,097,556 | 6/1978 | Toyama et al. | 525/68 |
| 4,315,086 | 2/1982 | Ueno et al. | 525/391 |

FOREIGN PATENT DOCUMENTS

| | | |
|---|---|---|
| 5927942 | 8/1982 | Japan . |
| 5959724 | 9/1982 | Japan . |
| 5966452 | 10/1982 | Japan . |
| 5986653 | 11/1982 | Japan . |
| 9066452 | 4/1984 | Japan ............ 525/391 |

Primary Examiner—John Kight
Assistant Examiner—M. L. Moore
Attorney, Agent, or Firm—Richard J. Schlott

[57] ABSTRACT

Melt-processing a mixture of a polyphenylene ether (PPE) and an ethylenically unsaturated carboxylic compound, in the absence of an added free radical initiator such as a peroxide, serves to introduce carboxyl functionality into the PPE resin. The resulting carboxylated PPE resins are useful in forming alloys with more polar resins such as polyamides.

7 Claims, No Drawings

CARBOXYLATED PHENYLENE ETHER RESINS

BACKGROUND OF THE INVENTION

This invention relates to phenylene ether resins and more particularly to an improved method for preparing polyphenylene ether resins having carboxyl functionality.

Polyphenylene ether resins (PPE) have long been known for use as high temperature thermoplastics. For example, PPO, or poly(2,6-dimethyl-1,4-phenylene ether), was disclosed and described in U.S. Pat. Nos. 3,134,753 and 3,306,874. More recently, in U.S. Pat. No. 4,011,200, phenylene ether copolymer resins having improved thermal stability were described. These resins have achieved a high degree of acceptance, particularly for use in further blends with other polymers such as styrenic resins, described for example in U.S. Pat. Nos. 3,356,761; 3,383,435 and 4,038,543. Polyphenylene ethers are substantially non-polar in character, and are therefore difficult to blend with a great many of the more polar resins such as polyamides and polyesters. Moreover, the adhesion of PPE resins to a variety of conventional reinforcing materials such as glass fiber is often poor, and modification of the surfaces of such materials may be required in order to achieve adequate reinforcement of PPE resins.

Methods for modifying the non-polar character of PPE resins are known. The use of functional comonomers, as well as the use of metalation, sulfonation, chloromethylation and similar processes have been described for introducing reactive functionality into such resins. Treating preformed polyphenylene ethers with a combination of a styrenic monomer and maleic anhydride in the presence of a free-radical initiator is shown in U.S. Pat. No. 4,097,556 to provide polyphenylene ether-styrene-maleic anhydride graft copolymers which are said to be useful in blends with polyamides. Processes for directly attaching maleic anhydride to phenylene ether resins in the presence of a peroxide are shown in published Japanese applications Nos. 59/66452 and 59/59724. Blends of these maleated phenylene ether resins with polyamides are also disclosed therein, and the carboxylated resins are said to have improved affinity for glass.

Although the methods available for carboxylating phenylene ether resins and polyamides appear to be successful, further improvements are needed. Chemical modification of phenylene ether resins, either by use of functional comonomers or in a post-reaction, requires additional and costly process steps. The methods presently known for directly modifying phenylene ether resins generally require extended mixing times at melt processing temperatures and/or the use of free-radical compounds, conditions which tend to promote cross-linking and/or deterioration of the resin. Extended mixing at high temperatures also increases energy consumption and adds to production costs. An improved method for directly carboxylating phenylene ether resins which substantially reduces processing times and minimizes resin cross-linking and degradation is needed.

SUMMARY OF THE INVENTION

The process of this invention is an improved method for the carboxylation of phenylene ether resins, the process comprising melt-processing a mixture of a phenylene ether resin and an ethylenically unsaturated carboxylic compound.

DETAILED DESCRIPTION

The phenylene ether resins (or PPE resins) useful for the purposes of this invention include both the homopolymers prepared by the oxidative coupling of a 2,6-dialkylphenol as disclosed for example in U.S. Pat. No. 3,306,874, as well as the copolymers of 2,6-dialkylphenols and 2,3,6-trialkylphenols described in U.S. Pat. No. 4,011,200. In general, these resins are prepared by oxidative coupling of a 2,6-dialkylphenol such as 2,6-dimethylphenol or a mixture of a 2,6-dialkylphenol and a 2,3,6-trialkylphenol such as 2,3,6-trimethylphenol. In forming copolymers suitable for the practice of this invention, the proportion of 2,3,6-trialkylphenol will lie in the range of from about 2 to about 50 wt% based on total polyphenylene ether. However, the preferred copolymers will comprise from about 2 to 20 wt%, more preferably from about 2 to 10 wt % 2,3,6-trialkylphenol, and, correspondingly from about 98 to about 80, more preferably from about 98 to about 90 wt% 2,6-dialkylphenol. The synthesis of these homopolymers and copolymers by a variety of oxidative coupling processes is well known in the art, and such polymers have become available to the art from commercial sources.

Carboxylation of the phenylene ether resin is carried out by melt-blending a mixture of the phenylene ether resin with an ethylenically-unsaturated compound containing a carboxylic group, e.g. a carboxylic acid, ester, amide or anhydride group, such as for example maleic anhydride, itaconic anhydride, glutonic anhydride, citraconic anhydride, tetrahydrophthalic anhydride or the like, as well as the carboxylic acid, ester, amide and imide analogs thereof, i.e. maleic acid, itaconic acid, fumaric acid, dimethylmaleate, maleimide, tetrahydrophthalimide and the like. The carboxylic compounds useful for the pusposes of this invention may be more broadly characterized as having both a reactive ethylenic carboncarbon double bond and a reactive carboxylic functional group.

The phenylene ether resin and the carboxylic compound will be combined and melt-processed in conventional melt compounding equipment such as a compounding extruder or the like. Although it is at least conceptually possible to melt-mix the phenylene ether resin and then add the carboxylic compound thereto, the most practical and convenient processing method will be to dry blend the components thoroughly as powders and/or pellets to obtain a well-mixed and complete dispersion of the components and then meltmixing the dry blend. The application of high shearing forces together with external heating achieves a further thorough mixing of the components and melting of the resinous component and provides the conditions necessary to achieve the interaction of the carboxylic compound with the resin.

In carrying out the carboxylation step of the process of this invention, prolonged mixing times are to be avoided. Phenylene ether resins are high melt temperature materials and are difficult to melt mix thoroughly; high stock temperatures in the range of from 600°–750° F. are commonly used in PPE compounding operations. High shear mixing devices such as for example single or twin screw compounding extruders, are therefore generally preferred for successful melt-processing. Such devices, and particularly twin-screw compounding extruders, can rapidly melt process PPE resins with high shear and thorough mixing, permitting shortened residence times and thus reducing the extent of exposure to severe heat conditions; i.e., the heat history of the resin is minimized. The use of heated roll mills, Banbury mixers and the like for compounding these resins may require extended mixing times, which increases the heat history of the resin and may cross link, gel and/or oxidize the phenylene ether resin; hence although these devices may be employed for the purpose of this invention when care is used to avoid such detrimental results, these devices are not preferred.

The carboxylated phenylene ether resin produced in this process step may be used directly, as for example in preparing alloys with polyamides. However, the interaction of the carboxylic compound with the PPE resin may be incomplete, and the carboxylated polyphenylene ether may thus contain a substantial portion of unattached carboxylic compound, either as unreacted carboxylic compound or as a low-molecular weight reaction by-product. Low molecular weight carboxylic compounds such as maleic anhydride may interact deleteriously with condensation polymers such as polyesters or polyamides under melt blending conditions and, depending on the chemical nature of the carboxylic compound, may cross link such polymers and/or alter the molecular weight of the polyamide by chain scission or graft-linking reactions. Low molecular weight carboxylic compounds, if present, may also interact with plasticizers, antioxidants and other additives conventionally used with such resins, thereby reducing or even destroying their effectiveness.

It may therefore be desirable to remove any remaining low molecular weight carboxylic compounds. In as much as the unattached low molecular weight compounds are volatile at the temperatures required for melt processing, these compounds may be readily removed by devolatilizing the melt during or after the carboxylation step preferably by means of a vented or vacuum-vented extruder. Alternatively the unattached carboxylic compounds, if present, may be removed from the carboxylated phenylene ether resin in a separate process step, such as by extraction with a suitable solvent, or by dissolving the resin in a suitable solvent and then re-precipitating the resin.

The amount of carboxylic compound employed will thus depend in part upon the particular carboxylic compound selected and upon the melt processing conditions and equipment used in the carboxylation step. In general, the level of carboxylic compound attached to the phenylene ether resin will desirably lie in the range of from about 0.05 to 2 wt. %, preferably 0.05 to about 1.0 wt. % and still more preferably, from 0.1 to about 0.5 wt. %, based on phenylene ether resin. At levels below this range, little if any effect will be seen, while at levels much above 0.75 wt. % and particularly above 1.0 wt. %, a substantial reduction occurs in the physical properties of polyamide alloys prepared from the product, and some deterioration of the PPE resin may be seen. Where the melt processing conditions employed are highly effective in promoting the carboxylation, the level of carboxylic compound charged will approximate that desired in the carboxylated PPE. Where less efficient carboxylation processing conditions are used, and particularly where a devolatilization or other process step will be employed, thus removing any unattached low molecular weight carboxylic compound that results, higher levels of carboxylic compound may be charged. It may also be a desirable alternative method for some purposes to effect an even higher level of PPE carboxylation, then melt-blend the resulting carboxylated resin with sufficient un-carboxylated PPE resin to provide resin with the desired degree of carboxylation for further blending.

The carboxylated phenylene ether resins prepared by the process of this invention are particularly useful in preparing alloys with polyamides. These alloys may be prepared by further compounding the carboxylated phenylene ether resin with a polyamide resin.

The polyamides useful for preparing such alloys include the conventional injection-moldable polyamide resins known widely as nylon resins, including both aliphatic polylactams such as polycaprolactam (Nylon 6) and higher analogs such as Nylon 11 and Nylon 12, and polyamides formed from aliphatic diamines and aliphatic dicarboxylic acids such as polyhexamethylene sebacamide (Nylon 6,10) polyhexamethylene adipamide (Nylon 6,6) and the like. Further examples of useful polyamides include the amorphous as well as the crystalline versions, the toughened polyamides, and the aromatic-aliphatic copolymers, terpolymers and tetrapolymers. A great variety of these nylon resins are well-known and widely available commercially.

Combining the carboxylated phenylene ether resin with the polyamide may be accomplished by any of the common melt blending processes, including the use of compounding extruders, Banbury mixers, roll mills and the like. The powdered or pelletized resins may be dry blended, then fed to the processing equipment, or, alternatively, one of the resinous components may be fluxed in the melt processing equipment, then combined by adding the remaining resinous component, together with impact modifiers, additional pigments, dyes, fillers, stabilizers, antioxidants, lubricants, plasticizers and the like as may be desired, and according to the practices commonly employed in the thermoplastic compounding art.

The resulting alloy is a readily melt-processible thermoplastic exhibiting no significant delamination. These compositions are thus not highly-crosslinked, and yet do not exhibit any of the characteristics of the incompatible mixtures attained by a simple mixing and molding of phenylene ether resins and nylons. Whether this composition is an alloy of now highly compatible components or is a graft resin comprising a graft of nylon and polyphenylene components is not known. These compositions are useful thermoplastics, and may be further modified by the addition of fillers, reinforcing fibers, dyes, pigments, flame retardants, antioxidants, stabilizers, plasticizers, processing aids and the like, as is well-known and practiced in the molding art. Particularly useful are compositions further modified by the addition of suitable impact modifiers, and particularly those well-known and commonly used for the impact modification of polyphenylene ether resins, such as impact modified styrenic resins, block copolymer elastomer resins, olefin polymers and the like. The compositions may also be extended by further compounding with suitable resins, such as styrenic resins, as well as by the further addition of polyamides, polyphenylene ethers and the like.

The invention will be better understood by consideration of the following examples, which are obtained by way of illustration of the invention and not in limitation thereof.

In the examples, the following abbreviations and terms are employed:

PEC=copolymer of 2,6-dimethylphenol (95%) and 2,3,6-trimethylphenol (5%), prepared substantially by the process of U.S. Pat. No. 4,011,200.

H-PPE=homopolymer of 2,6-dimethylphenol, prepared substantially by the process of U.S. Pat. No. 4,011,200.

HDT=deflection temperature at 264 psi, ASTM D-648.

Impact=Izod impact, ft lbs/in notch, ASTM D-256 A (at room temperature).

Lubricant=Pluronic F88 ethylene oxide/propylene oxide copolymer, obtained from Wyandotte Chemical Co.

EXAMPLES 1-7

CARBOXYLATION OF POLYPHENYLENE ETHER RESINS

Dry blends of powdered PEC resins with varying levels of maleic anhydride were prepared by mixing the components thoroughly for five minutes in a Henschel blender. The dry blends were then fed to a 1¾" single screw compounding extruder, using a screw speed of 50 rpm and barrel and die temperatures in the range of 600°-620° F. and stock temperatures in the range 600°-625° F., to melt process the mixture. Aliquot samples of the resin, after being dissolved in chloroform, reprecipitated with isopropanol and dried, were analyzed by FTIR to demonstrate the presence of bound maleic anhydride. Analyses by L/C methods were used to determine the level of free maleic anhydride in the carboxylated resins. The carboxylated polyphenylene ether compositions of Example 1-7 are summarized in Table I, together with Control Example A, a PEC resin subjected to the same compounding process steps in the absence of maleic anhydride.

TABLE I

|  | Ex. No. | | | | | | | |
|---|---|---|---|---|---|---|---|---|
|  | 1 | 2 | 3 | 4 | 5 | 6 | 7 | A |
| PEC (pbw) | 100 | 100 | 100 | 100 | 100 | 100 | 100 | 100 |
| Maleic Anhyd charged (pbw) | 0.10 | 0.25 | 0.50 | 0.75 | 1.00 | 2.00 | 3.00 | 0 |
| Free Maleic, ppm | * | * | 10 | 40 | — | 665 | 1320 | 0 |

Notes:
Free maleic = unattached maleic anhydride present in extrudate.
* = below detection limits.

It will be apparent that the carboxylation of PEC using low levels of maleic anhydride is surprisingly effective in the absence of a free radical generator. However, with increasing levels of maleic anhydride (charged), the amount of free maleic anhydride is seen to increase substantially. At levels of 2 pbw and above, the amount of free maleic anhydride in the resulting resin becomes substantial.

EXAMPLES 8-14

ALLOYS OF POLYAMIDE AND CARBOXYLATED POLYPHENYLENE ETHER RESINS

The carboxylated PEC resins of Examples 1-7 were melt blended with an equal weight of nylon 6,6 by melt-mixing a dry blend of pelletized resins in a 1¾" compounding extruder. The extrudate was chopped and injection molded on a 3 oz Van Dorn screw injection molding machine to provide test specimens. The compositions and physical properties of the alloys are summarized in Table II.

TABLE II

|  | Ex. No. | | | | | | | |
|---|---|---|---|---|---|---|---|---|
|  | 8 | 9 | 10 | 11 | 12 | 13 | 14 | B |
| Carboxy. PEC: | | | | | | | | |
| Ex. No. | 1 | 2 | 3 | 4 | 5 | 6 | 7 | A |
| pbw | 50 | 50 | 50 | 50 | 50 | 50 | 50 | 50 |
| Nylon 6,6 | 50 | 50 | 50 | 50 | 50 | 50 | 50 | 50 |
| Impact | 0.60 | 0.80 | 0.80 | 0.80 | 0.80 | 0.80 | 0.50 | 0.20 |
| Insol, pbw | 6.98 | 9.09 | 7.22 | 16.12 | 18.10 | — | 22.73 | 6.40 |

The insoluble component of each composition was determined by extracting a pelletized sample first with 90% formic acid, then with hot (100° C.) toluene, to remove both the polar and non-polar soluble resin components. The insoluble residue remaining, apparently a cross-linked composition containing nylon 6,6 and PEC, was not further melt processable and could not be melt-pressed into films.

The level of insolubles is quite low at levels of maleic anhydride (charged) below about 0.75 (Examples 8-10), and increases sharply at and above that level. The impact properties of the alloys reaches a maximum at a level of only 0.25 pbw maleic anhydride, and is decreased significantly at the highest (3.0 pbw) level. It is thus apparent that the low levels of maleic anhydride incorporated into the phenylene ether resin by the process of this invention impart useful properties to the alloy, with as little as 0.1 pbw providing significant improvement in impact.

COMPARATIVE EXAMPLES C-F

In the following Comparative Examples, carboxylation of PEC resin with maleic anhydride was carried out substantially by the processes of Example 1-7, but including dicumyl peroxide as a free-radical generator. The resulting compositions were then melt-blended with Nylon 6,6 together with Kraton G 1651 impact modifier, using the proceedures of Examples 8-15. The compositions and their physical properties are summarized in Table III. Example 16, an alloy prepared from a carboxylated phenylene ether resin according to the practice of this invention, is provided by way of comparison.

TABLE III

|  | Ex. No. | | | | |
|---|---|---|---|---|---|
|  | C | D | E | F | 16 |
| Carboxylation | | | | | |
| PPE (pbw) | 100 | 100 | 100 | 100 | 100 |
| Maleic Anh. charged (pbw) | 0.5 | 0.5 | 0.5 | 0.5 | 0.5 |
| DiCUP (pbw) | 0.1 | 0.5 | 1.0 | 0.0 | 0.0 |
| Blends | | | | | |
| Carbox PPE (pbw) | 47.5 | 47.5 | (a) | 47.5 | 47.5 |
| Nylon 6,6 (pbw) | 47.5 | 47.5 | — | 47.5 | 47.5 |
| Kraton G (pbw) | 5.0 | 5.0 | — | 5.0 | 5.0 |
| DiCup (pbw) | — | — | — | 0.5 | — |
| Impact | 2.3 | 2.4 | — | 1.5 | 2.9 |

Notes:
(a) Composition E cross-linked in the extruder during carboxylation. No blend with Nylon 6,6 was attempted.

It will be apparent from these data that the use of a free-radical generator either in the carboxylation step as in Comparative Examples C-E, or during the blending with the polyamide as in Comparative Examples F, has a detrimental affect on impact properties, with severe degradation at the higher levels of peroxide.

It will be apparent that carboxylated PPE resins prepared according to the teachings of the invention provide alloys with polyamides that exhibit substantially improved properties compared with those prepared according to Japanese published applications Nos. 59/66452 and 59/58724 which employ a free-radical initiator in the carboxylation step.

EXAMPLE 17

A homopolymer of 2,6-dimethylphenol, H-PPE, prepared by the polymerization process described in U.S. Pat. No. 4,011,200, was carboxylated according to the procedure used in Examples 1–7, using 100 pbw H-PPE and 0.5 pbw maleic anhydride. The carboxylated H-PPE (47.5 pbw) was then melt-blended with 47.5 pbw Nylon 6,6 and 5.0 pbw Kraton G impact modifier, using the procedures of Examples 15–21. The extrudate was smooth and ductile, and injection molded specimens had an Izod impact value of 2.5 ft. lbs/in. notch.

EXAMPLE 18

PEC resin (100 pbw) and 1.0 pbw of itaconic acid were dry blended and melt-compounded in a 1¾" single screw extruder. The resulting carboxylated PEC resin (50 pbw) was then melt-blended with 50 pbw Nylon 6,6 in a compounding extruder, providing a smooth, ductile extrudate. The extrudate, on injection molding, gave test specimens having a 0.50 ft lbs/in notch Izod Impact value.

CONTROL EXAMPLE G

The proceedure of Example 18 was repeated using 1.0 pbw succinic anhydride in place of the itaconic acid. The blend of carboxylated PEC resin with Nylon 6,6 gave only a poorly compatibilized mixture when compounded on a single screw extruder, which could not be molded. Compounding in a 28mm twin screw extruder afforded only slight improvement, giving test specimens having a 0.21 ft lbs/in notch. The proceedure was repeated, using 1.0 pbw succinic anhydride and 0.5 pbw dicumyl peroxide per 100 pbw PEC. The blend of this material with Nylon 6,6 gave very rough, brittle extrudate when compounded on the twin screw extruder.

It will therefore be apparent that only ethylenically-unsaturated carboxylic compounds are effective in the carboxylation of PPE resins. The saturated analogs such as succinic anhydride are ineffective, even when employed together with a free-radical generator such as a peroxide compound.

The invention will thus be seen to be an improved process for preparing carboxylated phenylene ether resins by melt-mixing a mixture consisting essentially of 100 parts by weight of a phenylene ether resin and from 0.05 to about 2.0, preferably 0.1 to about 1.0, parts by weight of an ethylenically unsaturated carboxylic acid compound, as well as the carboxylated phenylene ether resins prepared by the process of this invention.

We claim:

1. A carboxylated phenylene ether resin, said carboxylated resin being the product of melt-mixing a mixture consisting essentially of 100 parts by weight phenylene ether resin and from 0.5 to 1.0 pbw of an ethylenically unsaturated carboxylic compound.

2. The carboxylated phenylene ether resin of claim 1 where the ethylenically unsaturated carboxylated compound is selected from the group consisting of carboxylic anhydrides and carboxylic acids.

3. The carboxylated phenylene ether resin of claim 1 wherein said carboxylic acid compound is maleic anhydride.

4. The carboxylated phenylene ether resin of claim 1 wherein said carboxylic acid compound is itaconic acid.

5. An improved process for preparing carboxylated phenylene ether resins comprising melt-mixing a mixture consisting essentially of 100 parts by weight of phenylene ether resin and from 0.05 to 1.0 pbw of an ethylenically unsaturated carboxylic compound to provide a carboxylated phenylene ether resin.

6. The process of claim 5 wherein said ethylenically unsaturated carboxylic compound is selected from the group consisting essentially of carboxylic anhydrides and carboxylic acids.

7. The process of claim 5 wherein said carboxylic compound is maleic anhydride.

* * * * *